United States Patent
Bagley

(10) Patent No.: US 8,567,704 B2
(45) Date of Patent: Oct. 29, 2013

(54) ROTARY GRATER

(75) Inventor: Justin Bagley, Seattle, WA (US)

(73) Assignee: Progressive International Corporation, Kent, WA (US)

(*) Notice: Subject to any disclaimer, the term of this patent is extended or adjusted under 35 U.S.C. 154(b) by 0 days.

(21) Appl. No.: 13/365,823

(22) Filed: Feb. 3, 2012

(65) Prior Publication Data

US 2012/0199681 A1  Aug. 9, 2012

Related U.S. Application Data

(60) Provisional application No. 61/440,712, filed on Feb. 8, 2011.

(51) Int. Cl.
  *B02C 17/02* (2006.01)
  *B02C 19/20* (2006.01)
  *A47J 42/00* (2006.01)

(52) U.S. Cl.
  USPC .......................... 241/93; 241/169.1; 241/273.3

(58) Field of Classification Search
  USPC ...................... 241/93, 169.1, 273.3
  See application file for complete search history.

(56) References Cited

U.S. PATENT DOCUMENTS

| | | | |
|---|---|---|---|
| 378,127 A * | 2/1888 | Baltzely | 241/273.3 |
| 1,468,311 A * | 9/1923 | Lengyel | 241/100 |
| 2,482,180 A | 4/1945 | Heard | |
| 2,505,114 A | 4/1950 | Hayman et al. | |
| 2,587,186 A * | 2/1952 | Mantelet | 241/273.3 |
| 2,604,916 A * | 7/1952 | Mantelet | 241/273.3 |
| 3,583,455 A | 6/1971 | Ostrowsky | |
| D227,534 S | 7/1973 | Hutzler | |
| D259,759 S | 7/1981 | Williams | |
| 5,100,506 A | 3/1992 | Sturtevant et al. | |
| D337,491 S | 7/1993 | So | |
| 5,702,061 A | 12/1997 | Kennedy et al. | |
| 5,803,378 A * | 9/1998 | Wolters | 241/93 |
| 6,135,375 A | 10/2000 | Kaposi et al. | |
| D438,433 S | 3/2001 | Kaposi et al. | |
| 6,244,529 B1 * | 6/2001 | Tardif et al. | 241/93 |
| D463,958 S | 10/2002 | Kon | |
| 6,766,972 B1 * | 7/2004 | Prommel et al. | 241/93 |
| 7,137,581 B2 * | 11/2006 | Takayama et al. | 241/169.1 |
| 7,469,848 B2 * | 12/2008 | Yamanaka et al. | 241/95 |
| 7,806,352 B1 * | 10/2010 | Reimann et al. | 241/93 |
| 2002/0153440 A1 | 10/2002 | Holcomb et al. | |
| 2007/0119995 A1 * | 5/2007 | Yamanaka et al. | 241/95 |
| 2008/0017737 A1 * | 1/2008 | So et al. | 241/93 |
| 2009/0090254 A1 | 4/2009 | Herren | |
| 2009/0178580 A1 | 7/2009 | Herren | |

(Continued)

FOREIGN PATENT DOCUMENTS

| | | |
|---|---|---|
| DE | 178171 | 9/1935 |
| EP | 1385409 | 6/2006 |

(Continued)

*Primary Examiner* — Faye Francis
(74) *Attorney, Agent, or Firm* — Lowe Graham Jones PLLC

(57) ABSTRACT

A rotary grater includes a main body having a portion of one side formed from a resilient material. An internal grating barrel includes a plurality of grating teeth and is configured to grate cheese or other food items. The barrel is positioned for rotation inside the main body, such that cheese within the main body can be urged against the barrel by pressure against the resilient material, which will collapse as the food item decreases in size.

7 Claims, 5 Drawing Sheets

(56) References Cited

U.S. PATENT DOCUMENTS

2009/0320696 A1    12/2009  Herren
2010/0270406 A1*   10/2010  Grace et al. .................... 241/93
2011/0226140 A1     9/2011  Herren

FOREIGN PATENT DOCUMENTS

| WO | 02085168   | 10/2002 |
| WO | 2007128153 | 11/2007 |
| WO | 2007128154 | 11/2007 |

* cited by examiner

ROTARY GRATER

PRIORITY CLAIM

This application claims the benefit of provisional application Ser. No. 61/440,712 filed Feb. 8, 2011, the contents of which are incorporated by reference.

FIELD OF THE INVENTION

This invention relates generally to devices for grating cheese and similar food items, particularly including graters having a rotating blade.

BACKGROUND OF THE INVENTION

Grating devices are commonly used for shredding cheese and other food items. Typically such graters have a handle and a planar grating surface, with the grating surface having a number of sharp teeth that engage the cheese or other food item. As the cheese is passed over the grating surface, it shreds the cheese through the grating surface.

Grating in this manner with standard planar or box graters can sometimes be challenging. It requires a manual back-and-forth action by the cook to press the cheese against the grater. If a significant amount of grating is required, it can be exhausting. Once the block of cheese is reduced in size, it can also be dangerous, requiring the user to take care to ensure that the user's fingers are not grated along with the cheese. These and other difficulties are presented by standard food grating devices.

SUMMARY OF THE INVENTION

The present invention comprises a barrel cylindrical grater having an integrated crank handle for rotational movement. The barrel is seated within a main body forming an interior cavity for receiving a food item to be grated. By rotating the crank handle while pressing the food item against the grating surface, the food item is grated.

In a preferred version, the main body is formed in two halves that pivot apart from one another to allow the barrel to be removed. Because the main body is symmetrical, replacement of the barrel in an inverted orientation allows grating to occur by rotation in the opposite direction, thereby allowing the grater to be used in any orientation as desired.

In the preferred version, a portion of the main body includes a section formed from a resilient and compressible material, allowing it to collapse toward the barrel upon a force imparted by the user. Accordingly, the user can continue to force the food item toward the rotating barrel even while the main body is pivoted into a closed position.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
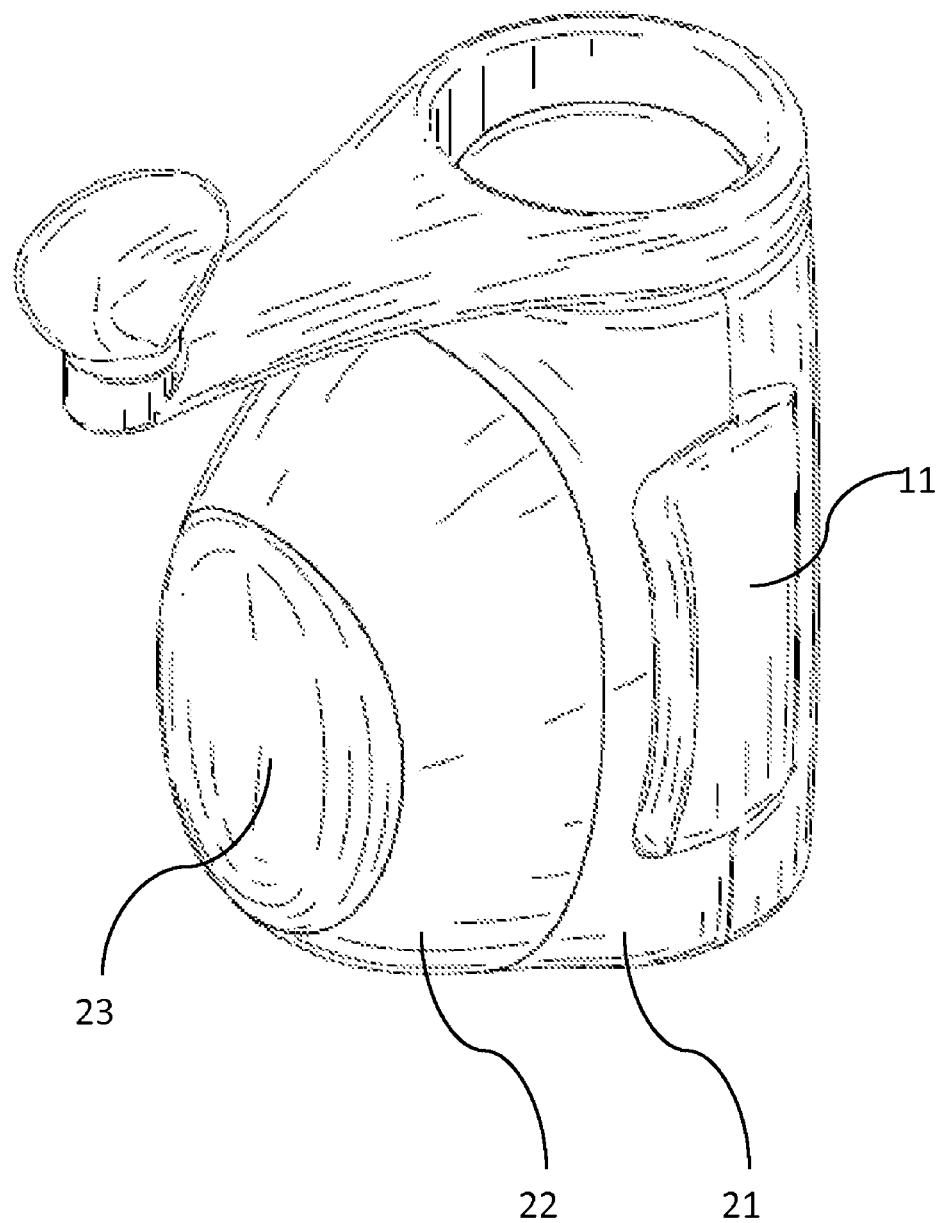
FIG. 1 is a perspective view of a preferred version of a rotary grater, shown in a closed position.
Figure 2:
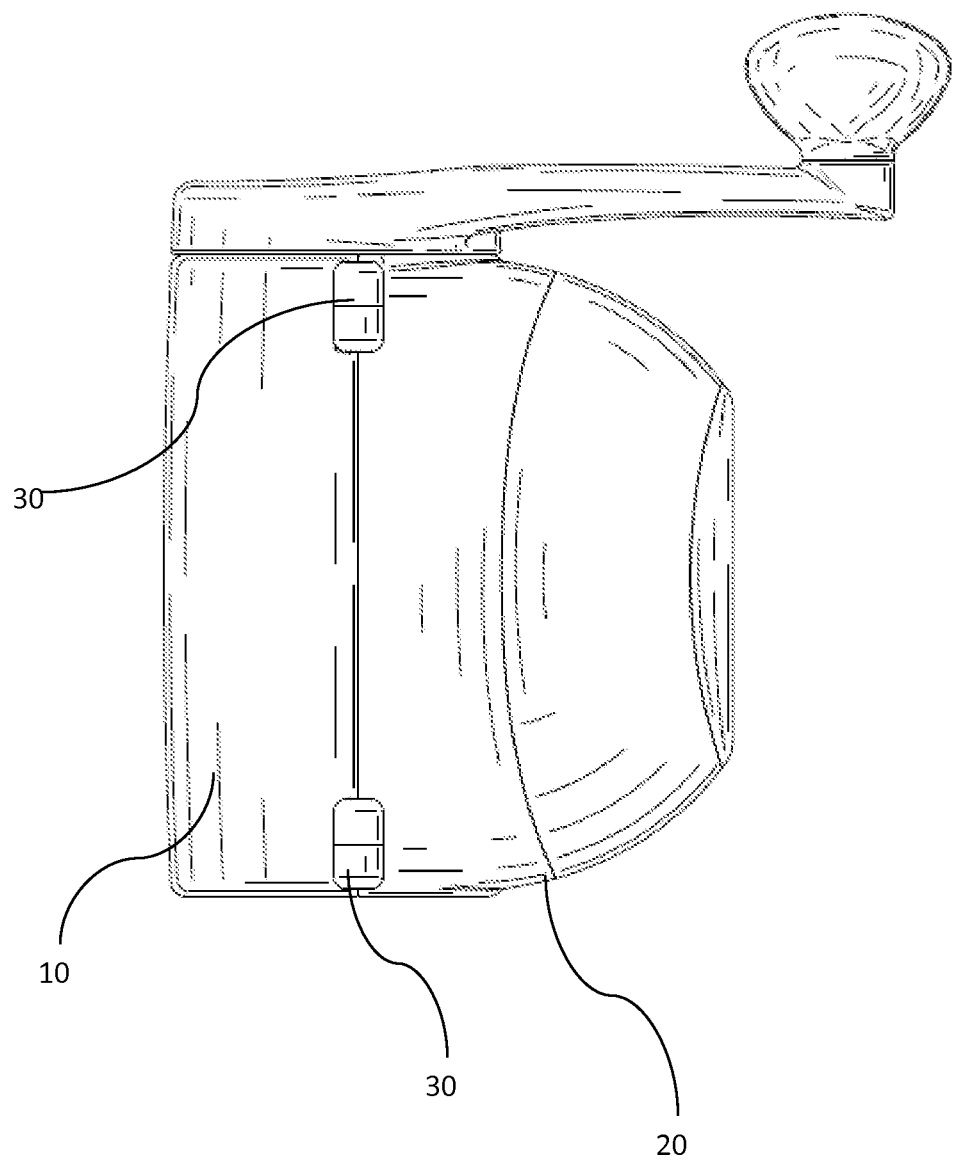
FIG. 2 is a back view of the rotary grater.
Figure 3:
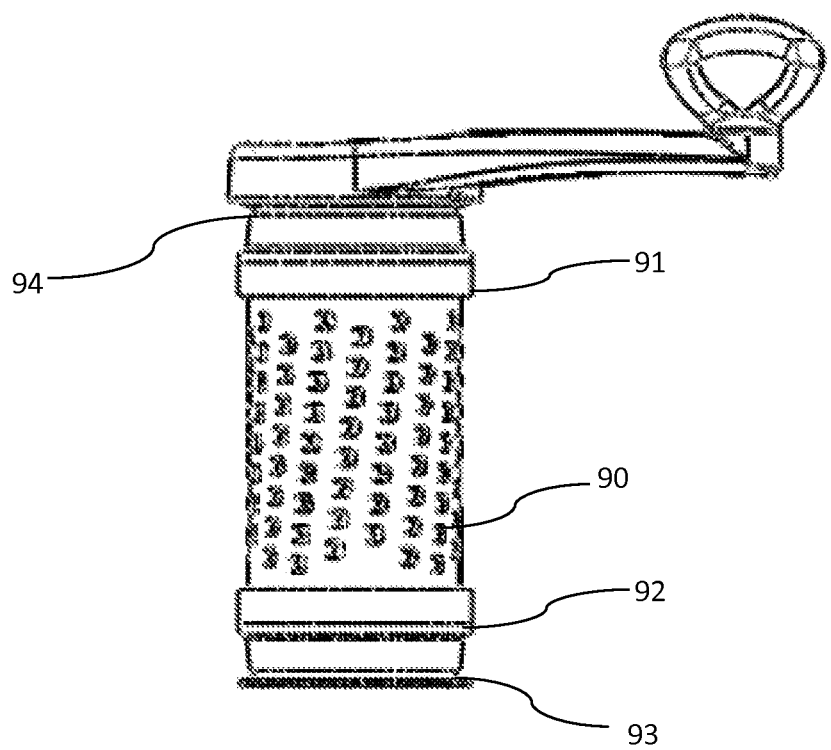
FIG. 3 is a partial exploded view of the rotary grater.
Figure 3:
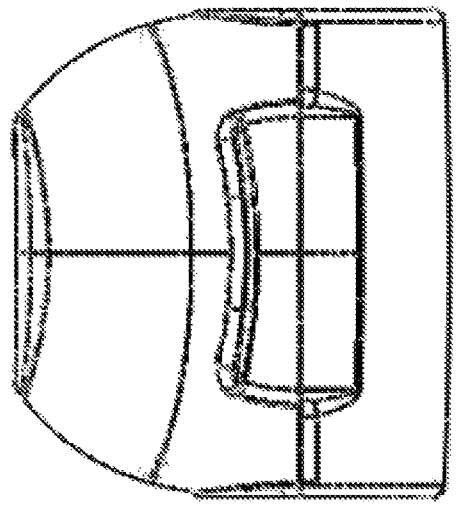
Figure 4:
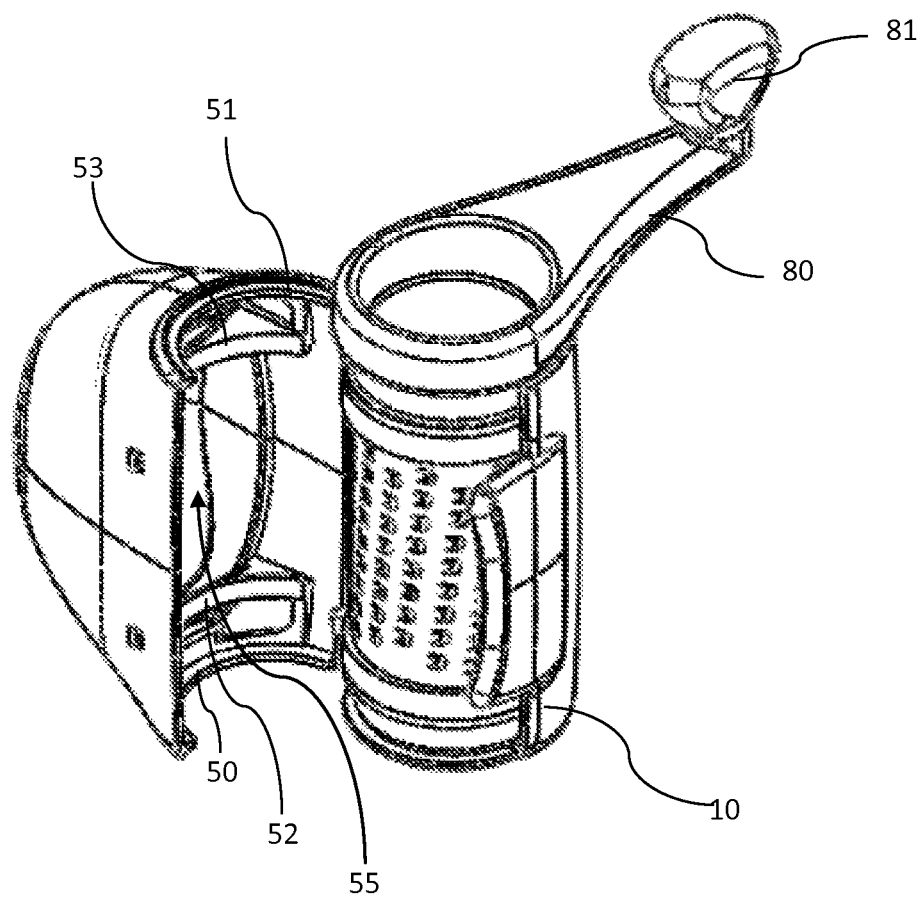
FIG. 4 is a front perspective view of the rotary grater, shown in an open position.
Figure 5:
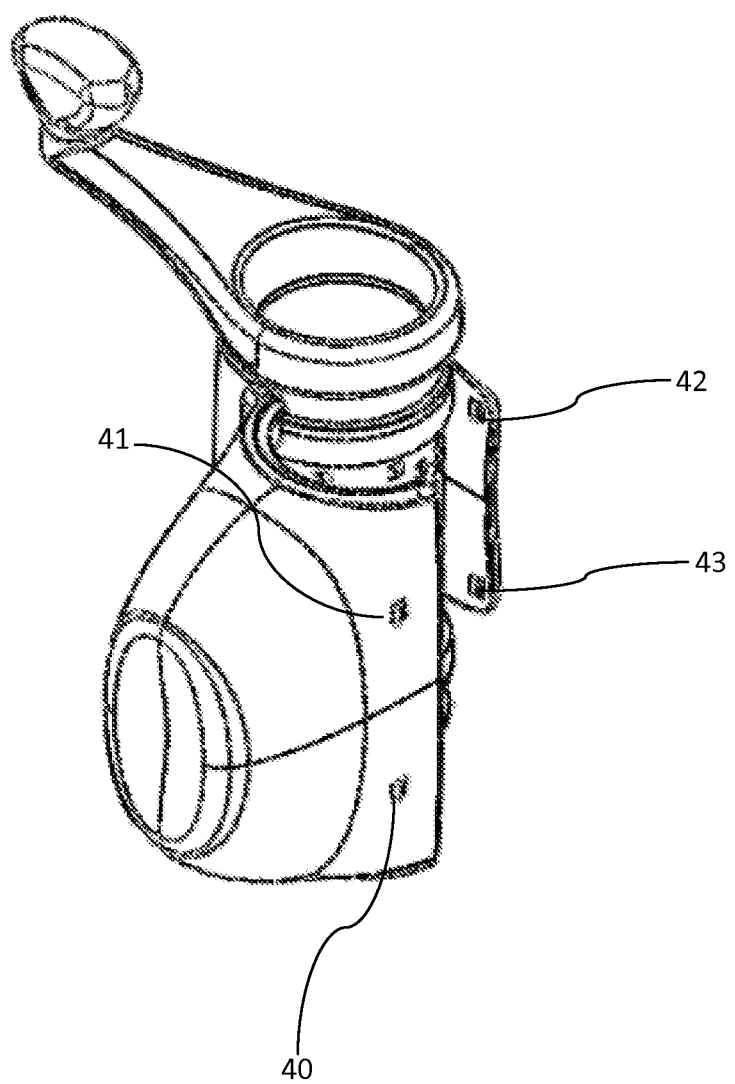
FIG. 5 is a side perspective view of the rotary grater, shown in an open position.

The exemplary grater includes a main body formed from a first side 10 and a second side 20, as indicated in FIG. 2. The two sides of the main body are pivotally secured to one another by one or more hinges 30, thereby allowing the main body to pivot to between a closed position as shown in FIGS. 1-3, or an open position as shown in FIGS. 4 and 5.

The first side 10 of the main body, in accordance with a preferred version, is formed from a substantially rigid material such as a food grade plastic. The first side is shaped to form substantially one half of an upright cylinder, as best seen in FIG. 4, thereby being shaped to receive the cylindrical barrel forming the grating surface. In other versions the external shape of the first side of the main body may varied such that it is able to support a grating barrel mounted for rotation as described further below.

The second side 20 of the main body is preferably formed in three components, as best seen in FIG. 1. As illustrated, the second side 20 includes a rigid front portion 21 configured to close against the first side 10 of the main body to enclose the barrel grater. The second side further includes a rigid back section 23 and an intermediate flexible portion 22 secured between the front and the back sections. Most preferably, the back portion 23 is formed from the same material as that of the front section 22. In the version as illustrated, the front and back portions are formed from a non-resilient material, meaning one that is rigid or semi-rigid but excluding a thermoplastic elastomer. The intermediate section is formed from a thermoplastic elastomer, but may be formed from other flexible or resilient materials such as silicone. In other versions, the second side is formed in only two components, including a rigid front portion and a flexible back portion, such that a flexible material is used to form both the intermediate portion 22 and the back portion 23.

The first side includes a clasp 11 that is integrally formed on the first portion and forms a tongue that extends beyond and overlies a portion of the second side of the main body. Each of the clasp and the second side of the main body has complementary surfaces configured to interlock with one another to hold the first side and the second side in a closed position. In the example as illustrated in FIG. 5, the second side includes a pair of tabs adjacent a pair of grooves 40, 41 that are configured to receive complementary tab and groove structures 42, 43 formed on an inner surface of the clasp. While the clasp is formed on the first side and configured to overlap onto the second side of the main body, this configuration may be reversed in different versions of the invention. Likewise, yet other arrangements may be used to allow the first side and the second side to securely closed or opened, as desired.

The particular arrangement as shown has advantages in that the main body is preferably sized to fit within the palm of a user's hand. Thus, a person grips the main body, having a portion of a hand on each of the first side and the second side to urge them together in use. This inward pressure is useful to press the cheese or other food item against the barrel, as explained below, and also to maintain the first and second sides of the main body in a closed position against one another.

At the bottom of the second side of the main body, an inward-directed flange 50 is formed, positioned slightly above the bottom edge of the second side. A portion of the sidewall extends below the flange to form a shoulder that forms a seat for receiving a circular rim formed on the rotary barrel. A similar flange 51 is formed along an upper end of the second side of the main body to form a similar seat. Likewise, substantially similar flanges are formed on the first side of the main body. When the first and second sides of the main body are pivoted into a closed position, the flanges form a substantially complete circle at the top and bottom ends of the main body. The relatively large size of the overlying clasp further ensures that the two sides will not become separated in use.

The interior of the second side of the main body forms a cavity 55 for receiving a food item such as a block of cheese, as best seen in FIG. 4. As described further below, the flexible nature of the use of a resilient material for at least the intermediate section 22 of the second side allows the user to press the second side against the first side. As the cheese is grated by the rotary barrel, further pressure causes the second side to collapse, allowing the user to continue to maintain pressure against the food item to press it against the barrel.

In addition to the circular flange forming a seat as described above, the second side of the main body may also incorporate upper and lower support structures 52, 53 to provide additional structural support against the force applied by a user to compress the intermediate resilient section.

The rotary grater further includes a barrel 90 having a cylindrical cutting surface. In some versions of the invention the barrel need not be a perfect cylinder or even fully rounded, so long as it can serve as a grating surface when rotated. The barrel is preferably formed from stainless steel and includes numerous teeth adjacent openings to grate the food item as the cylinder is rotated to drag its surface across the surface of the food item. The barrel is hollow in the center, as illustrated in FIG. 4, allowing the grated cheese to pass into the center of the barrel and fall out a bottom portion of the barrel.

The barrel includes a crank arm 80 and a knob or handle 81, as illustrated in FIGS. 3 and 4. The crank is preferably fixed in position with respect to the barrel such that rotation of the crank causes rotation of the barrel at the same time. The handle, however, is pivotally secured to the crank arm to allow a user to rotate the crank and barrel by grasping and rotating the handle.

The barrel is formed with upper and lower end caps 91, 92 providing structural support for the grating surface. Preferably the end caps are formed from a rigid plastic material, though other rigid materials may also be suitable.

The lower end cap 92 includes a peripheral circular flange and a recessed channel 93 formed adjacent the flange. The inward-facing flange 50 formed on the second side of the main body is received within the channel 93 when the barrel is in position within the main body, thereby serving as a guide to both retain the barrel and direct its motion in a circular fashion. Similarly, an upper channel 94 is formed in the upper end cap 91, with the upper channel receiving the upper flange 51 of the second side of the main body. The channels 93, 94 likewise receive the inward flanges formed on the interior surface of the first side of the main body.

When the barrel is positioned within the main body and the main body is pivoted and locked in the closed position, the inward-facing channels formed on the main body are securely positioned within the channels formed on the end caps to retain the barrel against upward or downward movement but to allow the barrel to freely pivot about an axis defined by a central axis extending through the barrel or cylinder. Accordingly, rotation of the crank arm causes rotation of the cylinder within the main body. Any food item within the cavity formed in the second side of the main body will be pressed against the rotating grating surface, thereby grating the food item.

The cylinder forming the grating surface is hollow at its center, and each of the upper and lower end caps likewise form circular openings. Consequently, cheese or other food gratings produced by the rotating cylinder will fall through the hollow center of the cylinder and onto any surface directed by the user.

Because the barrel has end caps with the same flange and channel structure, it is reversible within the main body. Thus, the main body may be pivoted to an open position whereby the barrel can be removed, inverted 180 degrees (reversing the previous position of the end caps within the main body) and then pivoted to a closed position again. This allows the rotary grater to be reconfigured for grating by an opposite rotational direction of the cylinder so that users may operate the grater in either a left handed or right handed orientation.

In use, cheese or another food item is placed in the cavity forming the second side of the main body. As grating occurs, the size of the food item within the cavity is reduced and the surface of the food item may lose contact with the grating surface. The resilient and flexible intermediate portion, however, allows the user to press against the second side to collapse it in the direction radially inward against the cylinder. As the second side collapses, the back portion 23 continues to push against the food item, forcing it against the grating surface even as the food item becomes reduced in size as it is grated away. Accordingly, a user may safely grate a food item down to a small size in a safe fashion, without risk of the user's hands coming into contact with the rotating blades.

In accordance with the preferred version of the invention, the dimensions of the second side of the main body prevent an inner surface of the second side from coming into contact with the rotating cylinder. Thus, the front portion 21 of the second side has a width (measured radially away from the center axis of the cylinder when the main body is closed) that is great enough such that the inverted and collapsed intermediate section cannot reach the cylinder even when pressed fully inward toward the barrel. Most preferably the dimensional arrangement allows the front portion 21 to very nearly reach the barrel without actually making contact.

In accordance with an additional design feature, the upper and lower support structures 52, 53 further serve to restrict movement of the back portion 23 all the way to the rotating blade. In the illustrated example, the support structures are rigid members defining a height between them. The rigid back portion 23 is configured to have a height that is greater than that of the span between the support structures. As such, when the back portion is pressed inward toward the rotating barrel, it cannot fit between the support structures and the support structures thereby serve as a stop against further travel of the back portion in a direction toward the barrel. The back portion, or any other part of the second side of the main body, therefore cannot reach the rotating barrel and cannot be worn down or otherwise damaged by the barrel.

In alternate versions of the invention a greater portion of the grater may be formed from resilient materials. Thus, in one example the entire main body may be formed from a resilient material. This arrangement is less desirable than a version having a rigid side. Likewise, in some versions the second side need not have three sections, but rather may be formed primarily or entirely from a resilient material. In yet other versions the second side need not pivot against the first side to open and close. Instead, for example, it may completely separate and snap-fit or otherwise be attached to the first side to enclose the barrel.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A rotary grater, comprising:
   a main body having a first side and a second side, the first side and the second side being movable with respect to one another to define an open position and a closed position, the main body defining an internal space when the first side and the second side are in the closed position;
   the first side being formed from a rigid material, the second side being at least partially collapsible in a direction toward the first side when the first side and the second side are in the closed position, wherein the second side forms a convex shape and the second side is at least partially inverted into a concave shape when a force is applied to collapse the second side;
   the second side further comprising a first portion and a second portion, the first portion being adjacent the first side when the second side is in the closed position, the first portion being formed from a non-resilient material and the second portion being formed from a resilient material; and
   a barrel mounted for rotation within the internal space of the main body, the barrel having a plurality of external grating teeth and a channel within the barrel;
   whereby a food item engaging the barrel will be grated by the teeth and pass into the channel within the barrel.

2. The rotary grater of claim 1, wherein the barrel is cylindrical.

3. The rotary grater of claim 1, further comprising a crank attached to the barrel, whereby rotation of the crank causes rotation of the barrel.

4. The rotary grater of claim 3, wherein the barrel further comprises an upper end and a lower end, the upper end having an upper annular channel and the lower end having a lower annular channel.

5. The rotary grater of claim 3, wherein the first side is pivotally attached to the second side, the first side and second side being pivotable between an open position and a closed position.

6. The rotary grater of claim 1, wherein the second side further comprises a third portion, the second portion being positioned between the first portion and the third portion, the third portion being formed from a non-resilient material.

7. The rotary grater of claim 6, wherein the first portion and the third portion are each formed from a rigid material.

* * * * *